United States Patent [19]

Axvig et al.

[11] 4,060,868
[45] Dec. 6, 1977

[54] POWDER APPLYING APPARATUS AND PROCESS FOR MAKING SELF-LOCKING THREADED ELEMENTS

[75] Inventors: Maynard Arnold Axvig, Westminster; Jose Asuncion Franco, Los Angeles, both of Calif.

[73] Assignee: USM Corporation, Boston, Mass.

[21] Appl. No.: 760,137

[22] Filed: Jan. 17, 1977

[51] Int. Cl.² .......................... B23G 9/00; B05B 1/00; B05B 7/14
[52] U.S. Cl. .................................. 10/72 R; 10/10 P; 10/86 A; 118/308; 118/317
[58] Field of Search .................. 10/10 R, 10 P, 72 R, 10/86 R, 86 A, 2; 118/2, 8, 308, 317, 620, 622, 50, 306, 307; 151/7, 14.5

[56] References Cited

U.S. PATENT DOCUMENTS

| | | | |
|---|---|---|---|
| 2,884,895 | 5/1959 | Lopenski et al. | 118/622 X |
| 3,385,261 | 5/1968 | Wittemann et al. | 118/317 |
| 3,452,714 | 7/1969 | Burke et al. | 118/620 |
| 3,491,721 | 1/1970 | Gill et al. | 118/622 X |
| 3,894,509 | 7/1975 | Duffy et al. | 118/317 |
| 3,896,760 | 7/1975 | Duffy | 118/308 |
| 3,991,704 | 11/1976 | Hulstein et al. | 118/2 |
| 3,995,586 | 12/1976 | Crose et al. | 118/317 |

*Primary Examiner*—E. M. Combs
*Attorney, Agent, or Firm*—Benjamin C. Pollard; Richard B. Megley; Vincent A. White

[57] ABSTRACT

Apparatus and process for applying locking patches of resilient, heat softenable resin to internally threaded articles having openings at both ends, in which the threaded portions of the articles, heated to a temperature above the softening point of the resin to be applied, are moved on a conveyor as a uniform succession at a uniform continuous speed in a path for application of particles of the resin with the openings at the ends of the articles substantially uncovered, a stream of resin particles entrained in a gaseous jet is directed by a resin particle stream guide through the openings in successive moving articles against threaded areas of the articles where the particles adhere and melt to form locking patches, flow of the gaseous jet is controlled relative to movement of a repeating feature of the articles on the conveyor to supply the stream of resin particles when the stream guide is in, and to interrupt the stream of particles when it is out of particle applying relation to the articles, and a suction device is applied adjacent the upper openings in the articles during powder application to improve flow of the resin particles and to draw off resin particles which have passed through the articles and preferably also to keep the resin particle supply system clear.

In a preferred system, the guide is moved into and out of stream directing relation to successive articles on the conveyor and is moved along with successive articles when in stream directing relation to such articles for a time to deposit a thickness of resin to give desired locking ability, the in and out movement of the stream guide being controlled relative to movement of a repeating feature of the articles, and the conveyor is a pair of spaced belts on which hex headed fasteners are arranged in flat to flat continuous succession with their axes in generally up and down position and with the lower openings of the fasteners left uncovered by the space between the belts.

9 Claims, 3 Drawing Figures

POWDER APPLYING APPARATUS AND PROCESS FOR MAKING SELF-LOCKING THREADED ELEMENTS

FIELD OF THE INVENTION

This invention relates to improvements in powder spray apparatus and methods of making self-locking internally threaded articles in which deformable plastic is secured on the threaded surface of the articles.

BACKGROUND OF THE INVENTION

In U.S. Pat. No. 3,498,352 entitled Self-Locking Threaded Element in the name of R. J. Duffy dated Mar. 3, 1970 and assigned to the assignee of the present invention, there is disclosed a method and apparatus for making a self-locking threaded element by directing a stream of heat softenable resin particles against the threaded surface of a heated element. The procedure shown in the patent of supporting a series of threaded articles on a conveyor belt for heating and treatment with resin particles, presents the difficulty with a succession of internally threaded articles that resin is deposited on the end faces of the threaded elements.

Also, in U.S. Pat. No. 3,894,509 entitled Apparatus for Manufacture of Fasteners in the name of R. J. Duffy et al. issued July 15, 1975 and assigned to the assignee of the present invention, there is disclosed an apparatus and method for mass production of internally threaded self-locking elements including an arrangement for disposing a succession of heated internally threaded elements on a conveyor, with each element in association with an individual powder applying tube arranged to direct a stream of heat softenable resin particles upwardly through the lower opening of the element against the thread surface to form resin locking patches.

The method and apparatus of U.S. Pat. No. 3,894,509, while effective to form locking patches on internally fasteners at a very high production rate, requires a conveyor and powder applicator tube arrangement for each size of threaded fastener treated.

SUMMARY OF THE INVENTION

It is an object of the present invention to provide a rapid and inexpensive powder spray method and apparatus for continuous manufacture of a variety of self-locking threaded elements.

To these ends and in accordance with the present invention, there is provided an apparatus and process in which a continuous succession of the threaded elements are conveyed at a uniform continuous speed, a self-cleaning intermittent powder spray operates to provide a stream of resin particles entrained in a gaseous jet to a guide, which may be movable into and out of the lower openings in successive articles, when the guide is in position to direct the stream against the threaded surface of an article and cuts off when the guide is not in such position and a control device is provided to control the stream and, if desired, to move the guide into and out of stream directing relation to successive articles in response to movement past a reference location of a repeating feature of articles on the conveyor.

BRIEF DESCRIPTION OF THE DRAWINGS

The invention will be described further in connection with the attached drawings in which.

DESCRIPTION OF THE PREFERRED EMBODIMENT

Figure 1:
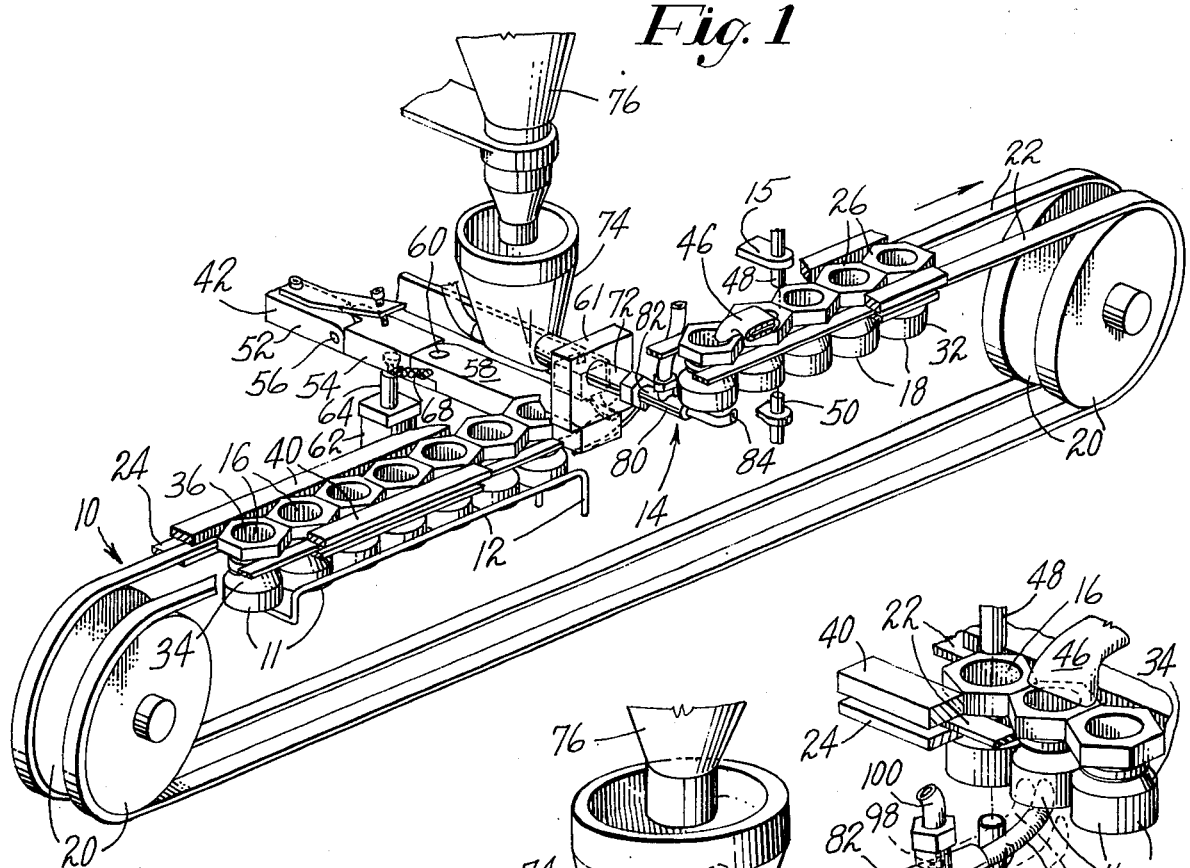
FIG. 1 is an angular, diagrammatic view with parts broken away of apparatus according to the present invention for forming a self-locking internally threaded article.

The invention will be described in connection with the apparatus shown in the drawings but it will be understood that other forms of the components of the apparatus may be used. Referring to FIG. 1, apparatus for treating internally threaded articles 11 includes a conveyor 10 for moving the articles through the successive steps of the process, a heater 12 for raising the temperature of the articles 11 above the softening point of the resin to be applied, a resin particle applicator 14 and a control device 15 for bringing the resin applicator 14 into and out of resin applying relation with successive articles 11 on the conveyor 10.

The conveyor 10 may be any suitable device for moving a succession of internally threaded articles 11 in uniform relation and at the uniform speed with their upper openings 16 and lower openings 18 unobstructed past the heater 12 and applicator 14, and is shown as a belt-type conveyor which may be the same as the conveyor shown in the patent to Burke et al., U.S. Pat. No. 3,452,714. The conveyor as shown in FIG. 1, comprises two pairs of pulleys 20, the pulleys of each pair being adjustable as to the space between them and a pair of parallel belts 22 supported and driven by the pulleys 20. Supporting tracks 24 are provided beneath the upper flights of the belts 22 to prevent excessive flexing of the belts 22 under the weight of the articles 11 being treated. As discussed below, heating of the articles 11 is normally effected by a high frequency induction coil 12 and it is preferred to use non-metallic belts 22 to avoid heating action on the belts by the high frequency employed to heat the articles 11.

Figure 3:
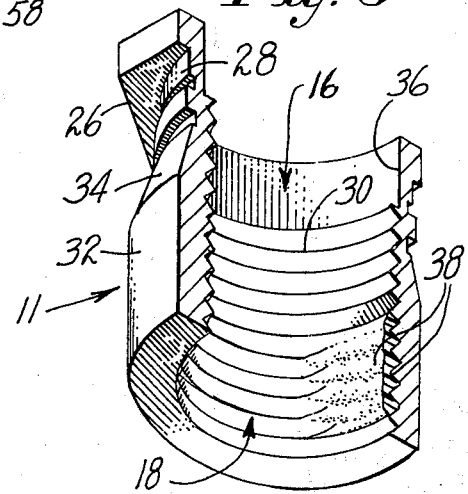
FIG. 3 is a sectional view of a specialty internally threaded article showing the disposition of a locking patch on the thread.

The specialty internally threaded article 11 shown in FIG. 3 has a hex head 26, connecting portion 28 having a diameter less than the distance between opposing flats of the hex head 26 and an internally threaded section 30 including a cylindrical portion 32 and a conical section 34 tapering from the diameter of thhe cylindrical portion 32 to the diameter of the connecting portion 28. The opening 36 through the connecting portion 28 and hex head 26 has a diameter which approximates the root diameter of the internally threaded section 30. As shown in FIG. 3, the deposited resin locking patch 38 covers the crests, sides and valleys of selected areas of the internally threaded surfaces.

The articles 11 are fed to the belts 22 by suitable feeders, (not shown), and are disposed with portions resting on the spaced belts leaving the upper openings 16 and lower openings unobstructed. The specialty nuts 11 shown in the drawings are disposed with the hex portions 26 arranged in flat to flat relation and with internally threaded sections 30 extending down between the belts 22. With the specialty nuts 11 shown, the elongated heating coil 12 is disposed beneath the belts to heat the threaded sections 30.

It will be understood that conventional hex nuts may be arranged in flat to flat relation with corner portions resting on the spaced belts 22, and may be guided by side members 40 during an initial portion of their travel on the conveyor. With hex nuts which rest entirely above the belts, the coil may be disposed above the belts 22. Also, where the coil is above the belts and may be in proximity to the tracks 24 along which the belts 22 travel it may be desirable to use non-metallic track sections in portions of the length adjacent the coil 12.

A resin particle applicator 14 for supplying a stream of resin particles entrained in a gaseous jet, is mounted on an articulated support arm 42 operable to move the guide or nozzle 44 of the applicator for directing streams of resin particles upward through the lower opening 18 of an internally threaded article 11 when the guide is in particle directing relation to each of the successive articles 11 carried by the conveyor 10.

There is also a vacuum exhaust orifice 46 arranged above the upper openings of the articles 11 a the particle applying location to retard deposition of resin particles on the upper face of the article 11 being treated and also to draw air through the lower opening 18 in the article 11 to improve the particle depositing flow of the stream of resin particles.

Figure 2:
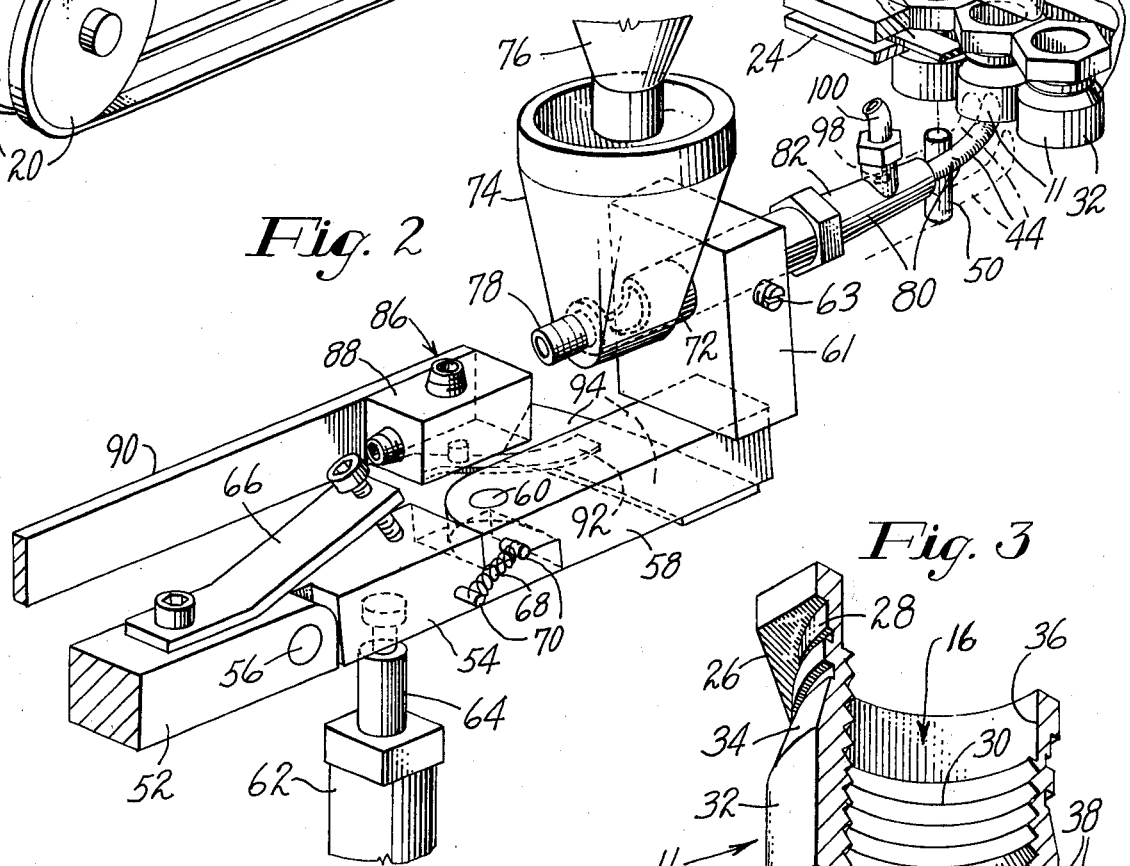
FIG. 2 is a diagrammatic, angular view with parts broken away of a resin particle applicator, the mounting for the applicator and a control arrangement.

Movement of the applicator 14 to bring the guide or nozzle 44 into and out of resin particle depositing relation to an internally threaded article 11 is effected by a control device 15 including a sensor responsive to movement past it of a repeating feature of the articles on the conveyor 10. Any suitable type of sensor may be used such as electrical, optical or mechanical and may be responsive to corners, projections, openings or any other convenient feature. In the form shown, the sensor involves a downwardly directed air jet 48 disposed above the succession of articles 11 in position such that, with the articles 11 in one position, air will pass down through the openings in the articles 11 and will be detected by the detector member 50 disposed beneath the succession of articles and, with further movement of the articles 11 on the conveyor, the air jet will be blocked by the walls of the articles 11 to disrupt the flow of air. This sensor will be disposed relative to the resin applying location so that when the air is able to pass through the opening in one of the articles 11 in the succession, the applicator guide or nozzle 44 will be moved upwardly from the position shown in dotted lines in FIG. 2 into the position shown in solid lines in which it extends into the lower opening 18 in the article to be treated and when the flow of air is cut off, the nozzle or guide 44 will be moved out of the opening 18 in the article being treated.

To achieve this motion of the applicator guide or nozzle 44, the applicator is mounted on an articulated carrier arm 42 of which a first member 52 may be clamped or otherwise adjustably secured to a standard (not shown) to assure the desired relation of the guide or nozzle 44 to the openings 18 in the succession of articles 11. An intermediate member 54 is hingedly connected to the first member 52 by a horizontal pin 56 around which the intermediate member 54 may be swung up and down; and a third member 58 is secured to the opposite end of the intermediate member 54 in hinged relation for swing in a horizontal direction about a vertical pin 60. The applicator 14 is mounted in a block 61 secured to the end of the third mount member and is held firmly in the block by a set screw 63.

A piston cylinder arrangement 62 is disposed with the piston member 64 in relation to the intermediate member 54 to move it up and down in response to signals from the control device 15. When activated to swing the intermediate member 54 upwardly, the applicator nozzle or guide 44 enters the opening 18 at the lower end of a threaded article 11, upward swing of the intermediate member being limited by an adjustable stop device 66. The nozzle 44 is within the opening 18 in the article 11 so that movement of the article 11 by the conveyor also moves the nozzle or guide 44 along with the article 11 and swings the third member 58 about the pin 60 so that the nozzle or guide 44 travels with the article 11 from the position shown in solid lines in FIG. 2, to the position shown in broken lines to the left of the solid lines. On signal from the control device 15, for example by cutting off of the air flow by the walls of an article 11 passing the sensor 15, the piston cylinder arrangement 62 is activated to lower the intermediate member 54 to move the nozzle 44 out of the opening 18 in the article 11 and the third member 58 is swung back to its initial position (lower set of dotted lines) by a spring 68 secured to pins 70 on the intermediate member 54 and the third member 58.

The applicator 14 includes a manifold section 72 with a funnel-like conical feed member 74 through which resin particles are introduced into the manifold from a continuous resin feed device 76. Any suitable resin feed device may be used such as the screw feed arrangement shown in the Burke et al patent referred to above. Gas is supplied to the manifold 72 through the connection 78 at the end adjacent the conical feed member 74 to create a gaseous jet in which resin particles introduced through the feed member 74 are entrained to form a stream of resin particles. A nozzle piece 80 is mounted at the other end of the manifold 72 and includes a channel section 82 adjacent the manifold section 72 and a guide section or nozzle 44 of smaller cross section which curves upwardly to a discharge orifice 84 which is introduced into the opening 18 at the lower end of an internally threaded article 11 in response to signals from the control device 15 as discussed above. The guide section or nozzle 44 is of dimensions and shape such that when introduced into the opening in an article it will screen off a leading thread or threads to prevent deposition of resin particles on the leading thread or threads to enable easy assembly of the article with a mating member.

A control member 86 for the gas supply, shown as an air switch 88 mounted on a supporting arm 90 has a switch activating lever 92 which is moved to supply gas to the manifold 72 by an arm 94 attached to the third member 58 which enagages the switch lever 92 when the piston cylinder device 62 raises the intermediate member 58. The stream of resin particles and gas continues until the control device 15 sends a signal to lower the applicator 14, and the supply of air is cut off as the arm 94 on the third member 58 moves down out of engagement with the gas supply switch lever 92.

The supply of resin to the conical feed member is continuous and would tend to bridge within the conical feed member and to block the opening 96 to the manifold. Also, resin particles in the manifold 72 and in the nozzle piece 80 at the time gas supply is cut off would tend to collect and clog the passageway to the guide or nozzle section 44. Applicants have found that this bridging and clogging action may be prevented by the provision of a port 98 and a suction device 100 associated with the port 98 intermediate the nozzle piece orifice 84 and the opening 96 from the conical feed member 74 into the manifold 72. The suction at the port 98 pulls air in through the opening 96 from the conical feed member 74 into the manifold 72 and through the discharge orifice 84 of the nozzle 44 and draws off through the port, resin particles remaining in the manifold 72 or nozzle piece 80 when the gas supply is shut off, and also prevents the resin particles supplied to the conical feed member 74 from bridging and cutting the resin particles supplied to the conical feed member 74 from bridging and cutting off movement of the resin particles into the manifold 72. It has been found that when gas is supplied to generate a stream of resin particles in a gaseous jet, the action of the suction device 100 in the port 98 does not interfere with flow of the stream of resin particles because of their speed of movement past the port 98, but that the suction is effective to prevent clogging of the applicator channels when the gas supply is cut off.

Materials useful in particle form for forming the locking bodies or patches are the tough, resilient, heat softenable resins. Polyamide and polyester resins have been found particularly useful and a preferred polyamide resin is nylon 11. The size of the particles to be used depends to some extent on the size of the threaded element to which the shape is to be applied. The smaller the threaded element, the smaller the particles desired. For a ¾ inch internally threaded article, a useful range of particle sizes is 100 to 200 microns.

It has been found that effective priming for combination with the resin of the locking deposit may be obtained using a powder mixture formed by combining a minor proportion, i.e., from about 5 to about 35% by weight of a primer or tying agent, which may be in the form of particles or may be coated on the resin particles, with a major portion, i.e., from about 95 to about 65% by weight of particles of the resin material which makes up the main body of the locking deposit, both percentages being on the weight of the powder mixture. It appears that the primer or tying material fuses at a lower temperature than does the primary resin material and also that it is more fluid and more capable of wetting the threaded surface so that the heat of the internally threaded article causes it to fuse and flow into wetting engagement with the threaded surface of the internally threade article to provide the desired primer and tying action.

In forming locking deposits on the threaded surfaces of the internally threaded articles, the temperature selected will be governed by the softening or melting temperature of the primary resin material. Where the powdered resin is the polyamide, nylon 11 which has a melting point of 367° F., temperatures in the range of 450° to 650° F. have been found satisfactory. It is desirable that the temperature to which the internally threaded articles are heated be such that the sensible heat is sufficient to keep the temperature of the internally threaded articles above about 200° F. for at least about 20 seconds.

Heating of the threaded element, for example, an internally threaded article 10 may be effected by an inductive field or in an oven or by other heating means. It has been found that at a frequency of 10 kilohertz, a steel internally threaded article can be brought to the desired temperature by inductive heating in a matter of seconds. In a continuous process, the internally threaded articles may be passed through the inductive field at a rate providing the desired heating time.

The following Example is given as of assistance in understanding the invention more fully, but it is to be understood that the invention is not limited to the particular materials, conditions, or procedures of the Example.

EXAMPLE

Specialty nuts as shown in the drawing for association with ¾ inch bolts and having a distance between opposed corner portions of 1¼ inches and an outside diameter of the cylinder internally threaded portion of 1⅛ inches were supplied to a conveyor as shown in FIG. 1 to form a series with the hex heads in flat to flat relation and with the internally threaded portions extending down between the belts. The vacuum system and the powder supply feed were put in operation, and the conveyor belts were operated at a rate of 4 feet per minute. The internally threaded portions were moved through the induction heater coil which was supplied with power at 450 kiloherz which raised the temperatures of the articles to about 500° F. When the opening in the first article of the series reached the air jet of the sensor so that the air jet passing through the opening reached the detector element of the sensor, a control signal was generated to operate the piston to raise the intermediate and third sections of the articulated arm to bring the nozzle of the applicator into the lower opening of the second of the series of articles in position such that the nozzle shielded the lower threads against deposition of resin particles. When the articulated arm moved up, the projecting arm activated the gas supply switch to force gas into the applicator manifold where it entrained the resin powder introduced through the conical feed member and formed a stream of resin particles entrained in the gas which was projected through the nozzle against the threads of the heated articles. The powder was a mixture of a major portion of powdered polyamide resin (nylon 11) and a minor proportion of epoxy resin and had a particle size distribution of between 100 to 200 microns.

Movement of the articles by the conveyor belts brought a wall of the first article into position to block the passage of the sensor air jet and activated the control to move the piston to lower the applicator nozzle out of the opening in the article being treated. Downward movement of the articulated arm moved the projecting arm out of engagement with the gas control switch to shut off the supply of gas to the manifold. When the gas supply was shut off, the suction acting through the port in the applicator, drew air in through the nozzle and through the opening of the conical feed member to draw off resin particles which were retained in the applicator nozzle portion and manifold and to generate a downward current of air through the conical feed member to prevent bridging of resin particles in that member. Further movement of the articles by the conveyor belts, brought the opening in the second article into relation to the sensor air jet such that the jet passed through to the activated piston to repeat the procedure for the succeeding articles. At the rate of 4 feet per minute and with the ¾ inch internally threaded articles, the time of application of the stream of resin particles to the threads of each article was about one second. After removal of the articles from the conveyor, it was found that the selected area of the threaded surface of the article had caught and held plastic powder and had fused it to a continuous firmly adherent resin body and that the remaining threaded surface areas were largely free from resin deposit.

Having thus described our invention, what we claim as new and desire to secure by Letters Patent of the United States is:

1. In an apparatus for applying locking patches of resilient heat softenable resin to internally threaded articles having openings at both ends comprising:

a support for conveying at a uniform continuous speed for treatment a uniform succession of said threaded articles with the openings at the ends of said articles substantially uncovered, means for heating said threaded portions of said articles to a temperature above the softening point of said resin, means for providing a stream of fine particles of said resin entrained in a gaseous jet, means including a guide for directing said stream of resin particles through the opening at a first end of one of said articles against an area of the threaded portion of said one article during movement in said path to cause said resin particles to be softened by heat from said threaded portion and to adhere to said area, and vacuum exhaust means adjacent the opening at the other end of said article on said support in operative relation to draw air through said threaded portions to reduce deposition of resin particles in undesired areas of said articles and to draw off resin particles which have passed through said threaded portions, the improvement which comprises control means responsive to movement of a repeating feature in the articles of said succession past a reference location to activate said means providing a stream of resin particles when said guide is in said stream-directing relationship to a threaded area and to deactivate said means for providing a stream of resin particles when said guide is not in said stream-directing relationship, said means for providing a stream of particles entrained in a gaseous jet comprising a conduit terminating in a discharge orifice from said guide for directing said stream of resin particles against said area, a gas supply connected to deliver a stream of gas through said conduit and out through said orifice, a continuous resin particle supply, and an opening in said conduit for passage of resin particles from said supply into said conduit at a location to be entrained and carried through said conduit and out through said orifice by said gas stream, means activated by said control means to shut off said gas supply to interrupt said stream of resin particles when said guide is not in position to direct said stream against a threaded area of said article and to restore said gas supply to resume discharge of said stream of resin particles when said guide is disposed to direct said stream against an area of a threaded portion of an article, a port into said conduit intermediate said conduit opening and said orifice and a suction device associated with said port to reduce pressure in said conduit to continuously pull air through said conduit opening and said orifice and to draw off through said port resin particles left in or deposited in said conduit when said gas supply is shut off.

2. Apparatus for applying locking patches of resilient resin to internally threaded articles as defined in claim 1 in which said support for conveying said articles comprises parallel belts spaced to support edge portions of said internally threaded articles with the threaded openings in said articles disposed to provide substantially unobstructed passage between said belts.

3. Apparatus for applying locking patches of resilient heat softenable resin to internally threaded articles as defined in claim 2 in which said articles are carried on said support with the axes of the threaded portions in substantially up and down position with the openings at the upper and lower ends of said articles substantially uncovered, said guide extends upwardly for directing said stream of resin particles upwardly through the opening at the lower end of one of said articles against an area of the threaded portion of said one article during movement in said path, said vacuum exhaust means is disposed adjacent the openings at the upper end of said article on said support, and means operated by said control means are provided to move said guide from an initial position not in stream-directing relation to a position in stream-directing relationship with said area of said threaded article on said support for travel with said article a time sufficient to build up a deposit of resin particles on said area during movement along said path, and to move said guide out of stream-directing relationship with said article and back to its initial position after build up of said deposit.

4. Apparatus for applying locking patches of resilient resin to internally threaded articles as defined in claim 3 in which said belts are spaced to receive opposed corner portions of a succession of internally threaded articles having hex portions arranged in flat to flat relation on said belts and in which said sensor is disposed to detect passage of threaded openings of an article moving in constant relation to an article into which said guide is to be inserted for directing a stream of resin particles.

5. Apparatus for applying locking patches of resilient resin to internally threaded articles as defined in claim 4 in which said means to move said guide includes an articulated support arm, means to move an intermediate section of said arm up and down to introduce said guide into and withdraw it from said opening, an end section carrying said guide and mounted on said intermediate section for movement of said guide by movement of said article from a first position when said guide is in said opening and means to return said end section to its first position when said guide is withdrawn from said opening.

6. An applicator for applying a stream of particles entrained in a gaseous jet at intervals as required, said applicator comprising a substantially horizontal conduit terminating in a discharge orifice, a gas supply connected to deliver a stream of gas through said conduit and out through said orifice, a continuous resin particle supply, an opening in said conduit for passage of resin particles from said supply into said conduit at a location to be entrained and carried through said conduit and out through said orifice by said gas stream, means to shut off said gas supply to interrupt said stream of resin particles and to restore said gas supply to resume discharge of said stream of resin particles, a port into said conduit intermediate said conduit opening and said orifice and a suction device associated with said port to continuously pull air in through said conduit opening and said orifice and to draw off through said port resin particles left in or deposited in said conduit when said gas supply is shut off.

7. In a process for applying locking patches of resilient heat softenable resin to internally threaded articles having openings at both ends comprising the steps of conveying a uniform succession of said threaded articles at a uniform speed in a path for treatment with the openings at the ends of said articles substantially uncovered, heating said threaded portions of said articles to a temperature above the softening point of resin to be applied, supplying a stream of heat fusible resin particles entrained in a gaseous jet and directed through the opening at a first end of one of said articles against an area of the threaded portion of said one article to deposit resin particles on said area, softening resin particles deposited on said area by heat from said threaded area to cause them to adhere to the area, applying suction adjacent the opening at the other end of said one article of said succession in operative relation for drawing in air through said opening at the first end to reduce deposition of resin particles on undesired areas of said articles and to draw off resin particles which have passed through said threaded portions, coalescing and fusing the deposited resin particles and cooling the resin from fused state to a solid resilient condition effective to provide locking action, the improvement which comprises initiating supply of said stream in a first direction transverse of said path by supplying resin particles continuously through an opening in a conduit for entrainment in a gaseous jet, passage through said conduit with said jet and discharge through an orifice against said one article when the movement of said one article brings it to position for effective resin deposition by said stream, cutting off the supply of said stream to said area of said article by stopping said air jet when movement of said one article moves it out of position for effective resin deposition by said stream, continuously applying suction to a port in said conduit intermediate said opening and said orifice to draw off resin particles remaining in said conduit or deposited in said conduit by said continuous supply while said gaseous jet is stopped, thereafter supplying said stream in said first direction through the opening at a first end of the next article in said succession to deposit resin on its threaded area by starting said gaseous jet, and controlling supply and cut off of said stream by movement of repeating features of said succession of articles past a reference location.

8. A process for applying locking patches of resilient heat softenable resin to internally threaded articles as defined in claim 7 in which the direction of said stream is changed progressively to follow the movement of said article for a time to build up a deposit of resin particles of desired thickness on said area, the supply of said stream of resin particles is cut off, thereafter said stream is supplied in said first direction through the opening at a first end of the next article in said succession and supply, cut off and direction of said stream is controlled by movement of repeating features of said succession of articles past a reference location.

9. A process for applying locking patches to internally threaded articles as defined in claim 8 in which said articles are conveyed with the axes of the threaded portions of said articles in substantially up and down position and with the openings at the upper and lower ends of said articles substantially uncovered.

said stream of heat fusible resin particles is directed upwardly through the opening at the lower end of one of said articles against an area of the threaded portion of said one article to deposit resin particles on said area, and suction is applied adjacent the openings at the upper ends of said articles of said succession.

* * * * *

UNITED STATES PATENT OFFICE
CERTIFICATE OF CORRECTION

Patent No. 4,060,868  Dated Dec. 6, 1977

Inventor(s) Maynard Arnold Axvig  et al.

It is certified that error appears in the above-identified patent and that said Letters Patent are hereby corrected as shown below:

Column 7, line 56, Claim 1, after the word "air" insert the word -- in --.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks